United States Patent
Glembocki et al.

[11] Patent Number: 6,068,095
[45] Date of Patent: May 30, 2000

[54] SADDLE BAG INSERT

[76] Inventors: Thomas M. Glembocki; John Converse, both of 341 Medford Lakes Rd., Tabernacle, N.J. 08088

[21] Appl. No.: 09/245,645

[22] Filed: Feb. 8, 1999

[51] Int. Cl.[7] .............................. A45C 3/00; A45C 7/00; A45C 13/04; A45C 13/36
[52] U.S. Cl. ...................... 190/127; 190/106; 190/127; 150/130; 150/900; 224/438; 383/33
[58] Field of Search .................... 190/106, 107, 190/122, 124, 125, 127; 150/129, 130, 900; 224/432, 438; 383/33, 127

[56] References Cited

U.S. PATENT DOCUMENTS

| | | |
|---|---|---|
| 3,473,713 | 10/1969 | Campbell .............................. 190/107 X |
| 3,903,944 | 9/1975 | Montgomery et al. .............. 224/438 X |
| 4,176,734 | 12/1979 | Wang ....................................... 190/49 |
| 4,580,706 | 4/1986 | Jackson et al. ...................... 224/432 X |
| 4,610,334 | 9/1986 | Pelavin ..................................... 190/122 |
| 4,629,040 | 12/1986 | Jones ....................................... 190/102 |
| 4,762,211 | 8/1988 | Krenzel ................................... 190/122 |
| 5,009,319 | 4/1991 | Jantzen ................................ 190/107 X |
| 5,433,303 | 7/1995 | Chan ....................................... 190/107 |

*Primary Examiner*—Sue A. Weaver
*Attorney, Agent, or Firm*—Henderson & Sturm LLP

[57] ABSTRACT

A saddle bag insert 10 for use with a soft sided saddle bag 100 having front 101 and rear 102 end panels, a pair of side panels 103, 104 and a floor panel 105. The saddle bag insert 10 includes an insert member 20 fabricated from an elongated, thin, flat, contoured strip of rigid yet flexible material 21 having an intermediate segment 22 and a pair of end segments 23, 24 that are adapted to resiliently conform to the contours of the front and rear end panels 101, 102 and the floor panel 105 to provide rigidity to the soft sided saddle bag 100.

4 Claims, 1 Drawing Sheet

SADDLE BAG INSERT

BACKGROUND OF THE INVENTION

1. Field of the Invention

The present invention relates to the field of reinforcing inserts for soft sided receptacles in general, and in particular to an insert specifically designed for motorcycle saddle bags.

2. Description of Related Art

As can be seen by reference to the following U.S. Pat. Nos. 4,176,734; 4,610,334; 4,629,040; 4,762,211; and 5,433,303, the prior art is replete with myriad and diverse inserts for soft sided receptacles of all types.

While all of the aforementioned prior art constructions are more than adequate for the basic purpose and function for which they have been specifically designed, they are uniformly deficient with respect to their failure to provide a simple, efficient, and practical insert construction that is specifically designed for motorcycle saddle bags to provide a more aesthetically pleasing appearance to the saddle bags, as well as prolonging their useful life.

As most motorcycle riders are well aware, saddle bags not only serve a useful purpose in storing diverse articles, but they also add to the aesthetic appearance of the motorcycle particularly when the saddle bags still retain their initial configuration due to the stiffness of new leather.

As a consequence of the foregoing situation, there has existed a longstanding need for a new and improved type of saddle bag insert that will restore an old, wrinkled, and sagging sided saddle bag to a condition approximating its "out of the box" appearance, and the provision of such a construction is a stated objective of the present invention.

BRIEF SUMMARY OF THE INVENTION

Briefly stated, the saddle bag insert that forms the basis of the present invention comprises in general, an insert member including an elongated contoured thin flat strip of generally rigid, yet flexible material such as plastic or thin steel that can be flexibly deformed to conform to the bottom and opposed ends of a motorcycle saddle bag.

As will be explained in greater detail further on in the specification, the sheet of material has an elongated contoured shape which includes a narrow intermediate segment disposed between two enlarged end segments. Each of the enlarged end segments are provided with tab elements that are dimensioned to be engaged under the interior seams of the bag on both the front and rear ends of the saddle bag.

In addition, the narrow intermediate segment of the insert member is provided not only to conform to any interior curvature on the motorcycle contacting side of the saddle bag, but also to facilitate the insertion and removal of the insert member relative to the interior of the saddle bag.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 2:
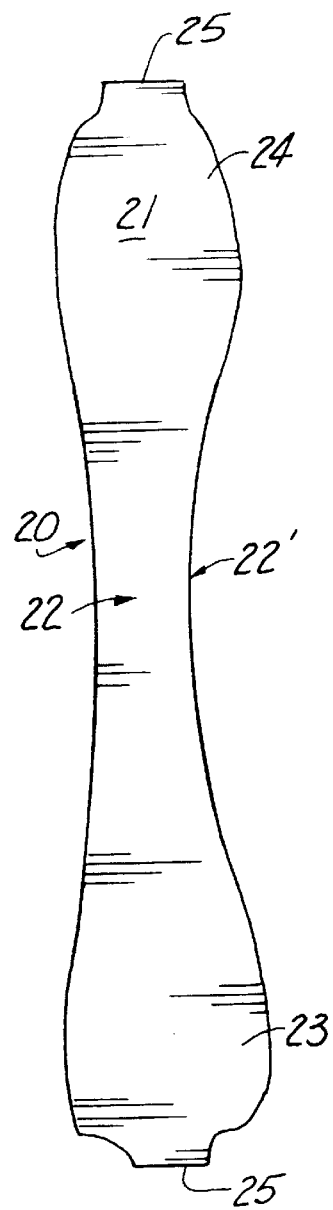
FIG. 2 is a top plan view of the insert member.
Figure 3:
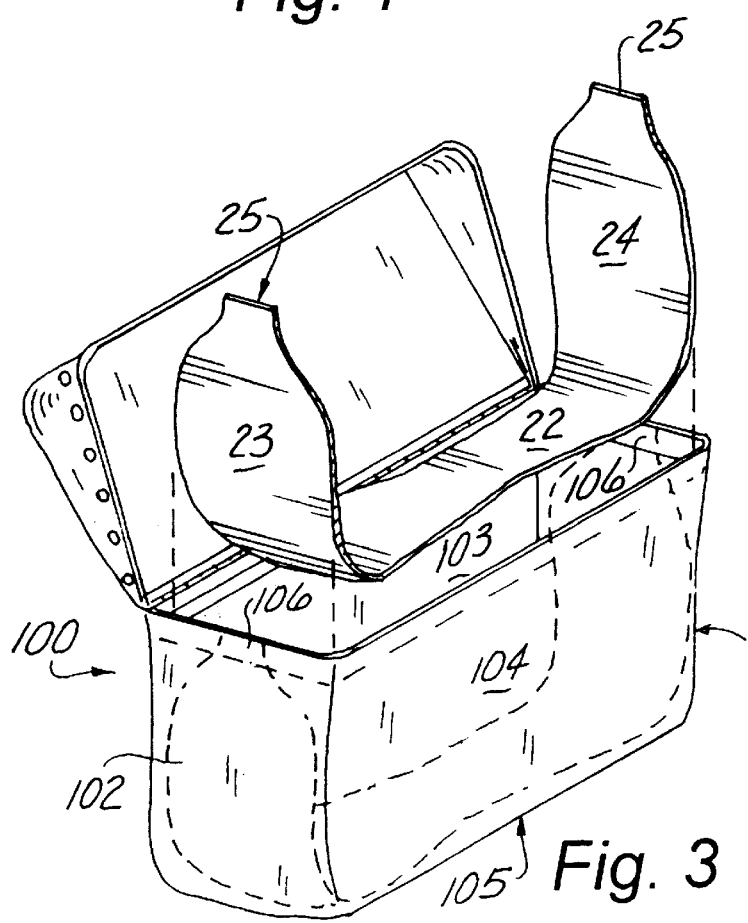
FIG. 3 is an exploded perspective view of a saddle bag and the insert member.

As can be seen by reference to the drawings, and in particular to FIGS. 2 and 3, the saddle bag insert that forms the basis of the present invention is designated generally by the reference number 10. The saddle lag insert 10 comprises in general, an insert member 20 fabricated from an elongated, contoured, flat, thin strip of rigid, yet flexible material 21 such as plastic or spring steel that may be resiliently deformed along its longitudinal axis into a generally U-shaped configuration.

As can best be seen by reference to FIG. 2, the insert member 20 has a generally tapered intermediate segment 22. At least one side 22' of the intermediate segment has a pronounced curvature whose purpose and function will be described in greater detail further on in the specification.

Still referring to FIG. 2, it can be seen that the intermediate segment 22 is flanked by two enlarged end segments 23, 24. The outboard ends of each of the enlarged end segments 23, 24 are provided with discrete tab elements 25 whose purpose and function will be described presently.

As shown in FIG. 3, the insert member 20 is dimensioned to be employed in the interior of a conventional soft sided motorcycle saddle bag 100 having front 101 and rear 102 end panels, an interior 103 and an exterior 104 side panels and a floor panel 105. At least the front 101 and rear 102 end panels are provided with an interior lip 106.

In addition, as can also be seen by reference to FIG. 3, the enlarged end segments 23, 24 are dimensioned to generally conform to the front 101 and rear 102 end panels and the relatively narrow intermediate segment 22 is dimensioned to lie along the longitudinal axis of the floor panel 105 when the tab element 25 are disposed beneath the interior lip 106 on the front 101 and rear 102 end panels.

Figure 1:
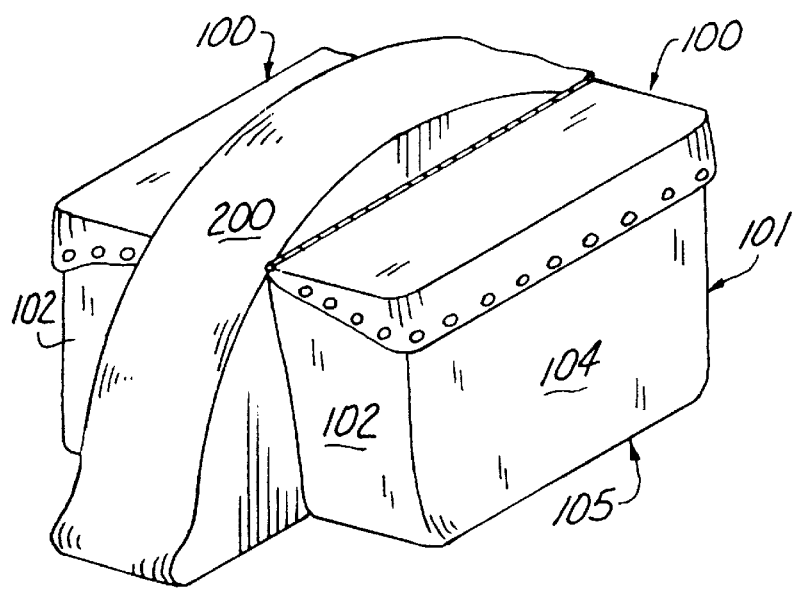
FIG. 1 is a perspective view of a pair of saddle bags equipped with the insert member of this invention.

Turning now to FIGS. 1 through 3, it can be appreciated that most motorcycle saddle bag arrangements include a pair of saddle bags 100 mounted on the opposite sides of the motorcycle rear fender 200. Many fenders have a lateral curvature that presses against the interior side panel 103 of the saddle bag 100.

As a consequence of the foregoing situation, at least one side 22' of the intermediate segment 22 of the insert member 20 is provided with a pronounced curvature that will accommodate the inwardly bellowing interior side panel 103 while still allowing the user to easily grasp the opposite sides of the intermediate segment 22 to install and remove the insert member 20 relative to the interior of the saddle bag.

It should also be appreciated at this juncture that the insert member 20 is intended to be flipped over so that the pronounced curvature as at 22' is always disposed adjacent to the interior side panel 103 of the saddle.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

We claim:

1. A saddle bag insert for use with a soft sided saddle bag having a front panel, a rear panel, an interior side panel, an exterior side panel, and a floor panel wherein the saddle bag insert comprises:

an insert member including an elongated contoured thin flat strip of generally rigid, yet flexible material having an intermediate segment and a pair of end segments wherein the strip of material is adapted to be resiliently deformed into a generally U-shaped configuration that generally conforms to the interior sides of the front end panel, the rear end panel, and the floor panel of the saddle bag and wherein the intermediate segment is substantially narrower than said end segments.

2. The saddle bag insert as in claim 1 wherein the end segments are provided with means for releasably engaging the end segments with the front and rear end panels.

3. The saddle bag insert as in claim 2 wherein at least one side of the intermediate segment is provided with a pronounced curvature.

4. The saddle bag insert as in claim 1 wherein said saddle bag is provided with an interior lip on at least the front end panel and the rear end panel; and the outboard end of each end segment is provided with a tab element that is dimensioned to be engaged by one of said interior lips.

* * * * *